US012776972B2

(12) United States Patent
Kher et al.

(10) Patent No.: US 12,776,972 B2
(45) Date of Patent: Oct. 27, 2026

(54) MICROWAVE NETWORK MONITORING SYSTEM

(71) Applicant: DISH Wireless L.L.C., Englewood, CO (US)

(72) Inventors: Pradipbhai Kher, Lewis Center, OH (US); Vivek Babu Vedullapalli, Parker, CO (US); Hung Chau, Cypress, TX (US)

(73) Assignee: DISH Wireless L.L.C., Englewood, CO (US)

( * ) Notice: Subject to any disclaimer, the term of this patent is extended or adjusted under 35 U.S.C. 154(b) by 78 days.

(21) Appl. No.: 18/898,235

(22) Filed: Sep. 26, 2024

(65) Prior Publication Data

US 2026/0089074 A1 Mar. 26, 2026

(51) Int. Cl.
*H04L 43/045* (2022.01)
*H04L 43/16* (2022.01)

(52) U.S. Cl.
CPC ............ *H04L 43/045* (2013.01); *H04L 43/16* (2013.01)

(58) Field of Classification Search
CPC .............................. H04L 43/045; H04L 43/16
See application file for complete search history.

(56) References Cited

U.S. PATENT DOCUMENTS 12,003,394 B1 * 6/2024 Lewis ................... H04W 24/08
2013/0163438 A1 * 6/2013 Wilkinson .......... H04L 41/5009 370/242
2022/0006726 A1 * 1/2022 Michael ................ H04L 45/745
2023/0236728 A1 * 7/2023 Dong .................... G06F 3/0685 711/154
2023/0305831 A1 * 9/2023 Yu ........................... H04L 67/56
2024/0086787 A1 * 3/2024 Yang ..................... H04L 41/145
2024/0426209 A1 * 12/2024 Ahmad ................... E21B 44/00
2025/0110022 A1 * 4/2025 Simpkins ................. G06N 7/01

* cited by examiner

*Primary Examiner* — Quang N Nguyen
(74) *Attorney, Agent, or Firm* — Jeremiah J. Baunach; Frontier IP Law PLLC

(57) ABSTRACT

A system and method for monitoring a multi-vendor microwave network accesses a cell site router (CSR) to obtain IP addresses of radio units, establishes direct Secure Shell (SSH) connections to these units, and retrieves performance data from multiple vendors' equipment. The data is processed to generate unified performance metrics, stored in a cloud-based system, and presented via a web-based graphical user interface. The system compares metrics to predefined thresholds, generates alerts, and presents graphical trends. It detects integrity values of microwave links, identifies high-priority links, and alerts relevant teams. The system provides a vendor-agnostic technique that enables real-time monitoring, automated health checks, and customizable alerts across diverse network equipment.

18 Claims, 18 Drawing Sheets

300

304

301

AUWCO00058A_AUWCO00047A collection time: 2024-05-16 08:00:21 MST

EVENT LOG 306 308 310 312 314 316 318 320 322

| Time | Sequence Number | Description | User Text | Severity | State | Card Type | Slot | Port |
|---|---|---|---|---|---|---|---|---|
| 16-05-2024,09:15:17 | 16621 | Enhanced Multi Carrier ABC LOF | | critical | cleared | 0 | 1 | 1 |
| 16-05-2024,09:15:05 | 16620 | Enhanced Multi Carrier ABC LOF | | critical | raised | 0 | 1 | 1 |
| 16-05-2024,09:12:42 | 16619 | Enhanced Multi Carrier ABC LOF | | critical | cleared | 0 | 1 | 1 |
| 16-05-2024,09:12:28 | 16618 | Enhanced Multi Carrier ABC LOF | | critical | raised | 0 | 1 | 1 |
| 16-05-2024,08:42:37 | 16617 | Enhanced Multi Carrier ABC LOF | | critical | cleared | 0 | 1 | 1 |
| 16-05-2024,08:42:24 | 16616 | Radio interface is up | | warning | event | 0 | 1 | 2 |
| 16-05-2024,08:42:24 | 16615 | Enhanced Multi Carrier ABC LOF | | critical | raised | 0 | 1 | 1 |
| 16-05-2024,08:42:24 | 16614 | Radio interface is down | | warning | event | 0 | 1 | 2 |
| 16-05-2024,04:31:42 | 16613 | Enhanced Multi Carrier ABC LOF | | critical | cleared | 0 | 1 | 1 |

324

MRMC PM Table 15min 326 328 330 332 334 336 338

| Interval | Integrity | Min profile | Max profile | Min bitrate | Max bitrate | Seconds above Threshold 1 | Seconds below Threshold 1 | Seconds below Threshold 2 |
|---|---|---|---|---|---|---|---|---|
| Thu, May 16, 2024, 08:00 AM | 1 | 0 | 0 | 29206 | 29206 | 20 | 0 | 0 |
| Thu, May 16, 2024, 07:45 AM | 1 | 0 | 0 | 29206 | 29206 | 900 | 0 | 0 |
| Thu, May 16, 2024, 07:30 AM | 1 | 0 | 0 | 29206 | 29206 | 900 | 0 | 0 |
| Thu, May 16, 2024, 07:15 AM | 1 | 0 | 0 | 29206 | 29206 | 900 | 0 | 0 |
| Thu, May 16, 2024, 07:00 AM | 1 | 0 | 0 | 29206 | 29206 | 900 | 0 | 0 |
| Thu, May 16, 2024, 06:45 AM | 1 | 0 | 0 | 29206 | 29206 | 900 | 0 | 0 |
| Thu, May 16, 2024, 06:30 AM | 1 | 0 | 0 | 29206 | 29206 | 900 | 0 | 0 |
| Thu, May 16, 2024, 06:15 AM | 1 | 0 | 0 | 29206 | 29206 | 900 | 0 | 0 |
| Thu, May 16, 2024, 06:00 AM | 1 | 0 | 0 | 29206 | 29206 | 900 | 0 | 0 |

A

FIG. 3

MICROWAVE NETWORK MONITORING SYSTEM

TECHNICAL FIELD

The present disclosure relates to network monitoring systems, and particularly microwave network monitoring systems.

BRIEF SUMMARY

In modern wireless telecommunication networks, microwave links play a crucial role as backhaul connections, particularly in areas where fiber optic infrastructure is impractical or cost-prohibitive. These links operate by transmitting high-frequency radio waves between fixed points, enabling data transmission over long distances. As networks evolve, microwave links must coexist and integrate with emerging technologies like 5G New Radio (NR) and Narrowband Internet of Things (NB-IoT), creating a complex ecosystem that demands sophisticated management and monitoring solutions.

Traditionally, network monitoring systems for microwave links have been vendor-specific, necessitating separate infrastructures and software for each vendor's equipment. This approach has led to numerous challenges, including high costs associated with licensing and maintaining multiple monitoring systems, complexity in managing different interfaces and data formats across vendors, and a lack of a unified view of the entire network. These issues hinder efficient troubleshooting and optimization, make it difficult to scale the monitoring solution as the network grows or incorporates new vendors, and increase training requirements for network operators who must manage multiple systems. Moreover, these traditional systems often rely on Simple Network Management Protocol (SNMP), which can be limited in its ability to provide detailed, real-time information about link performance and issues.

The microwave network monitoring system described herein addresses these challenges by providing a unified, vendor-agnostic platform for monitoring and managing microwave links across a multi-vendor network. This solution supports multiple vendors through a single interface, using Secure Shell (SSH) connections to directly access radio units instead of relying on SNMP. This technique enables more detailed and real-time data collection. The system's cloud-based architecture eliminates the need for on-premises hardware and facilitates easy scaling, while a unified web interface enables users to access the system without installing client software, thereby reducing deployment complexity and costs.

In an example embodiment, the network monitoring system described herein may access a cell site router (CSR) in the microwave network and obtain IP addresses of radio units from the CSR. The system then establishes direct SSH connections to these radio units using the obtained IP addresses. Through these connections, it retrieves performance data from radio units of multiple vendors. This data is then processed to generate unified performance metrics, which are stored in a cloud-based storage system. These unified metrics are presented via a web-based graphical user interface (GUI), accessible to multiple users without requiring local client software installation.

As part of its functionality, the system compares the unified performance metrics to predefined thresholds and generates alerts when these thresholds are exceeded. These alerts can be presented as graphical trends in the web-based GUI, providing intuitive visual representations of network performance. The system also stores historical performance data and can present historical performance trends, enabling long-term analysis and planning.

Furthermore, the method may involve detecting integrity values of microwave links based on the retrieved performance data. It identifies high-priority links based on these integrity values and alerts relevant teams about the status of these high-priority links. This proactive approach to network management facilitates prevent service disruptions and enables faster resolution of issues when they occur.

The system performs real-time performance monitoring, collecting and processing data to provide up-to-date information on link performance and potential issues. The system also conducts automated health checks on network components, alerting operators to potential problems before they impact service. Users can set custom thresholds for various performance metrics and receive alerts when these thresholds are exceeded, allowing for tailored monitoring based on specific network requirements.

The network monitoring system described herein enables network operators to significantly reduce costs associated with multiple vendor-specific systems. The system improves operational efficiency by providing a unified view of the entire network and enhances the overall performance and reliability of their microwave network infrastructure. The system's ability to work across multiple vendors and its use of direct SSH connections for data collection represent an improvement in microwave network monitoring technology, addressing long-standing challenges in the industry and paving the way for more efficient and effective network management.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
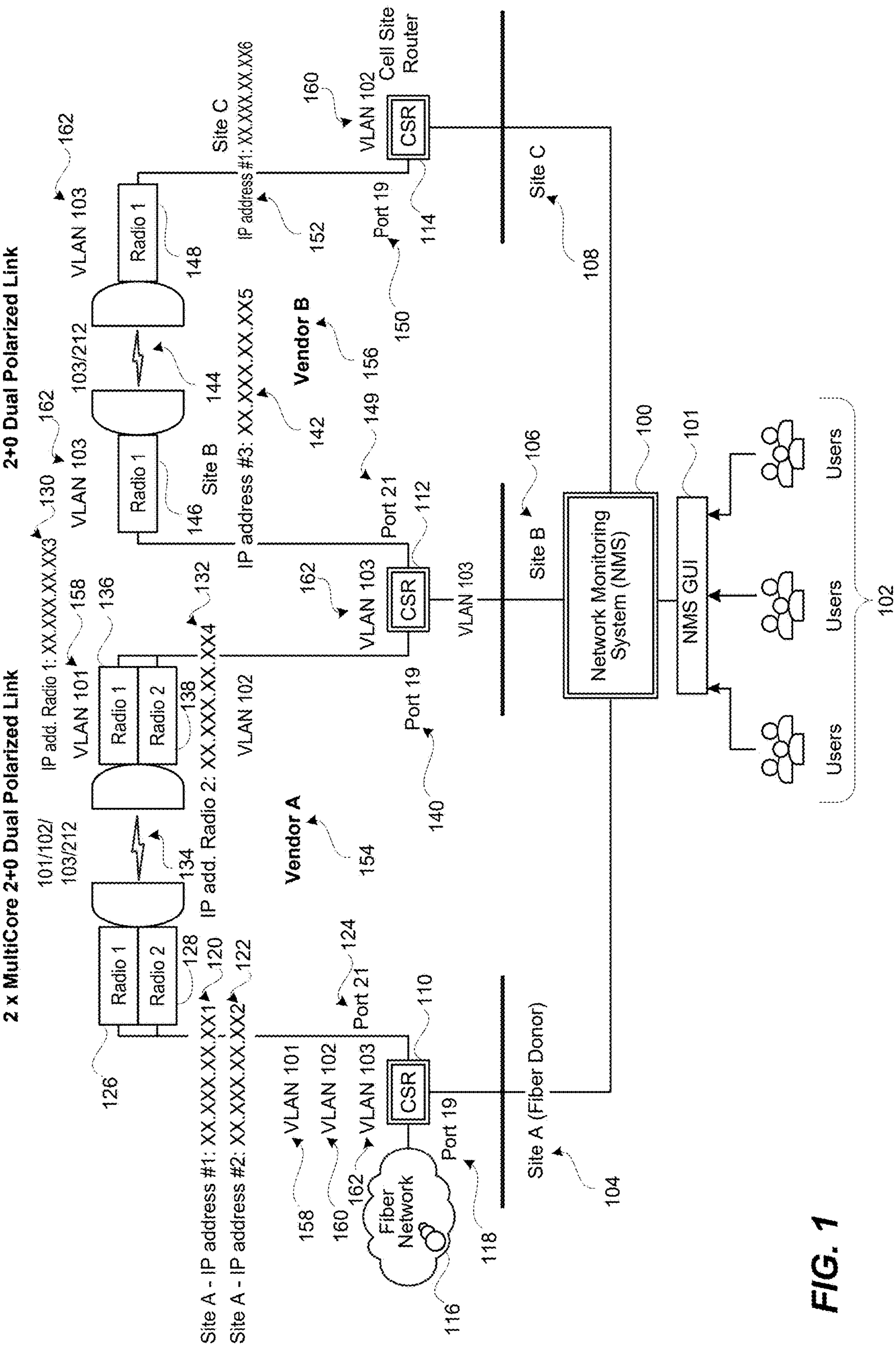
FIG. 1 illustrates an example network topology of a network monitored by the microwave network monitoring system, demonstrating its multi-vendor approach and network structure, according to one non-limiting embodiment.

FIG. 1 illustrates an example network topology of a network monitored by the microwave network monitoring system 100, demonstrating its multi-vendor approach and network structure, according to one non-limiting embodiment. Shown is a Network Monitoring System (NMS) 100 including an NMS Graphical User Interface (GUI) 101 accessible by multiple users 102 through web browsers, eliminating the need for local client software installation.

The network includes multiple sites: Site A 104, which serves as a fiber donor, Site B 106, and Site C 108. Each site is equipped with a Cell Site Router (CSR) 110, CSR 112, and CSR 114, respectively, that interfaces between the fiber network and the microwave radio units. Additional sites may be present in various different embodiments.

In an example embodiment, Site A 104 connects to the fiber network 116 via Port 19 118 of its CSR 110. The CSR 110 at Site A has two IP addresses, IP address 120 and IP address 122, corresponding respectively to two radio units, Radio 1 126 and Radio 2 128 connected to Port 21 124 of the CSR 110. These radios form a 2×MultiCore 2+0 Dual Polarized Link 134 to Site B 106.

Site B 106 receives the microwave transmission from Site A 104 through its Radio 1 136 and Radio 2 138, which have respective IP addresses, IP address 130 and IP address 132 and connect to Port 19 140 of the CSR 112. Site B 106 then extends the network to Site C 108 via a 2+0 Dual Polarized Link 144 from its Radio 1 146 to Site C's Radio 1 148. Radio 1 146 at Site B has IP address 142 assigned to it and is connected to port 21 149 of CSR 112.

Site C 108 receives the microwave transmission from Site B 106 through its Radio 1 148, which connects to Port 19 150 of the CSR 114. The Radio 1 148 at Site C has IP address 152 assigned to it.

The system supports multiple vendors, as illustrated by the Vendor A 154 and Vendor B 156 vendor boxes, showcasing the multi-vendor capability of the NMS 100. Additional vendors may be supported in various different embodiments.

Virtual Local Area Networks (VLANs) are used to segment traffic across the network. VLAN 101 158 and VLAN 102 160 are used between Site A and Site B, while VLAN 103 162 is used between Site B and Site C. VLAN 103 162 is also carried through to the user side of Site C's CSR 114.

In an example embodiment, the NMS 100 accesses the network by first connecting to the CSR 110, CSR 112, and CSR 114 to obtain the IP addresses of the radio units. The NMS 100 then establishes direct Secure Shell (SSH) connections to each radio unit using these IP addresses, bypassing the need to go through the CSRs for subsequent data collection. This technique enables the NMS 100 to efficiently gather performance data from radio units of different vendors, process this data into unified metrics, and present it through the web-based NMS GUI 101 to users 102.

This topology enables the microwave network monitoring system to provide a unified, vendor-agnostic monitoring solution for complex microwave networks, offering significant advantages in terms of flexibility, cost-efficiency, and ease of use compared to traditional vendor-specific monitoring systems.

Figure 2:
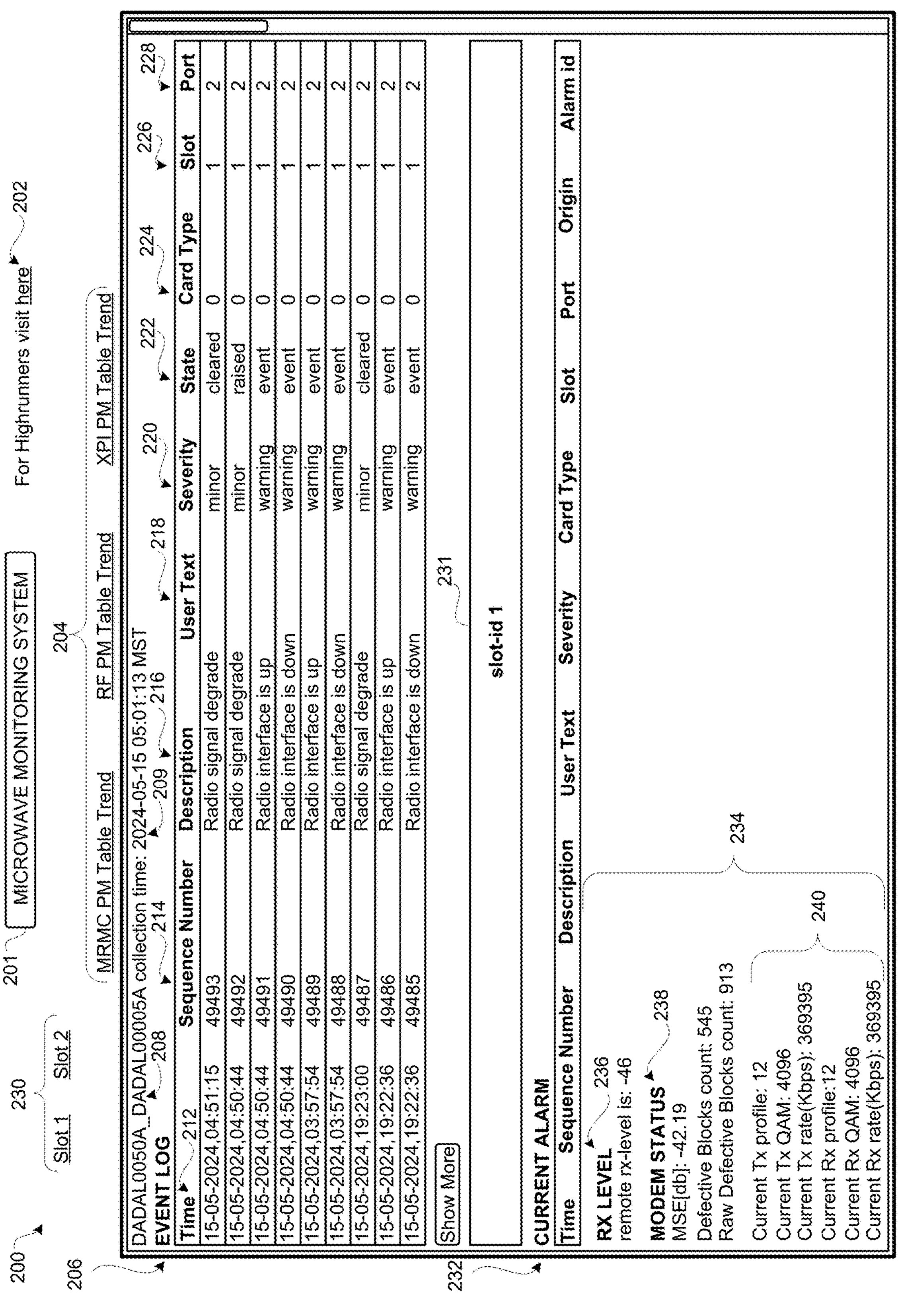
FIG. 2 illustrates an example graphical user interface (GUI) of the microwave network monitoring system, according to one non-limiting embodiment.

FIG. 2 illustrates an example graphical user interface (GUI) 200 of the microwave network monitoring system 100. The interface 200 comprises several components that provide comprehensive monitoring and management capabilities. The detailed view provided by interface 200 enables network operators to quickly assess the health and performance of individual microwave links, facilitating efficient troubleshooting and maintenance. The combination of historical event logs and real-time status information provides a comprehensive overview of the microwave network's operation.

In an example embodiment, at the top of the interface 200, a header 201 displays "MICROWAVE MONITORING SYSTEM" and includes a link 202 for accessing high-runner information, enabling quick identification of problematic microwave links. Below this, tab selectors 204 allow users to switch between different views, including "MRMC PM Table Trend", "RF PM Table Trend", and "XPI PM Table Trend".

The main body of the interface 200 is divided into sections. The first section 206 displays the event log 206 for a specific selected microwave link, identified by its unique identifier 208 and collection timestamp 209. The event log 206 is presented in a tabular format, with columns for Time 212, Sequence Number 214, Description 216, User Text 218, Severity 220, State 222, Card Type 224, Slot 226, and Port 228. This comprehensive event log 206 enables users to track and analyze events occurring on the specific selected microwave link, identified by its unique identifier 208.

A slot selector user interface element 230 shown below header 201 enables users to switch between different slots.

Below the event log in section 206, shown is "slot-id 1" 231 currently selected. The lower portion of the interface 200 displays current alarm information 232. While no active alarms are shown in the present example, the table structure is visible with columns for various alarm attributes.

At the bottom of the interface 200, section 234 provides real-time status information for the selected slot. Section 234 includes the RX LEVEL 236, displaying the remote rx-level value. The MODEM STATUS 238 shows MSE (dB) value and defective block counts. Current transmission and reception profiles 240 are also displayed, including Tx/Rx profile numbers, QAM values, and data rates.

Figure 3:
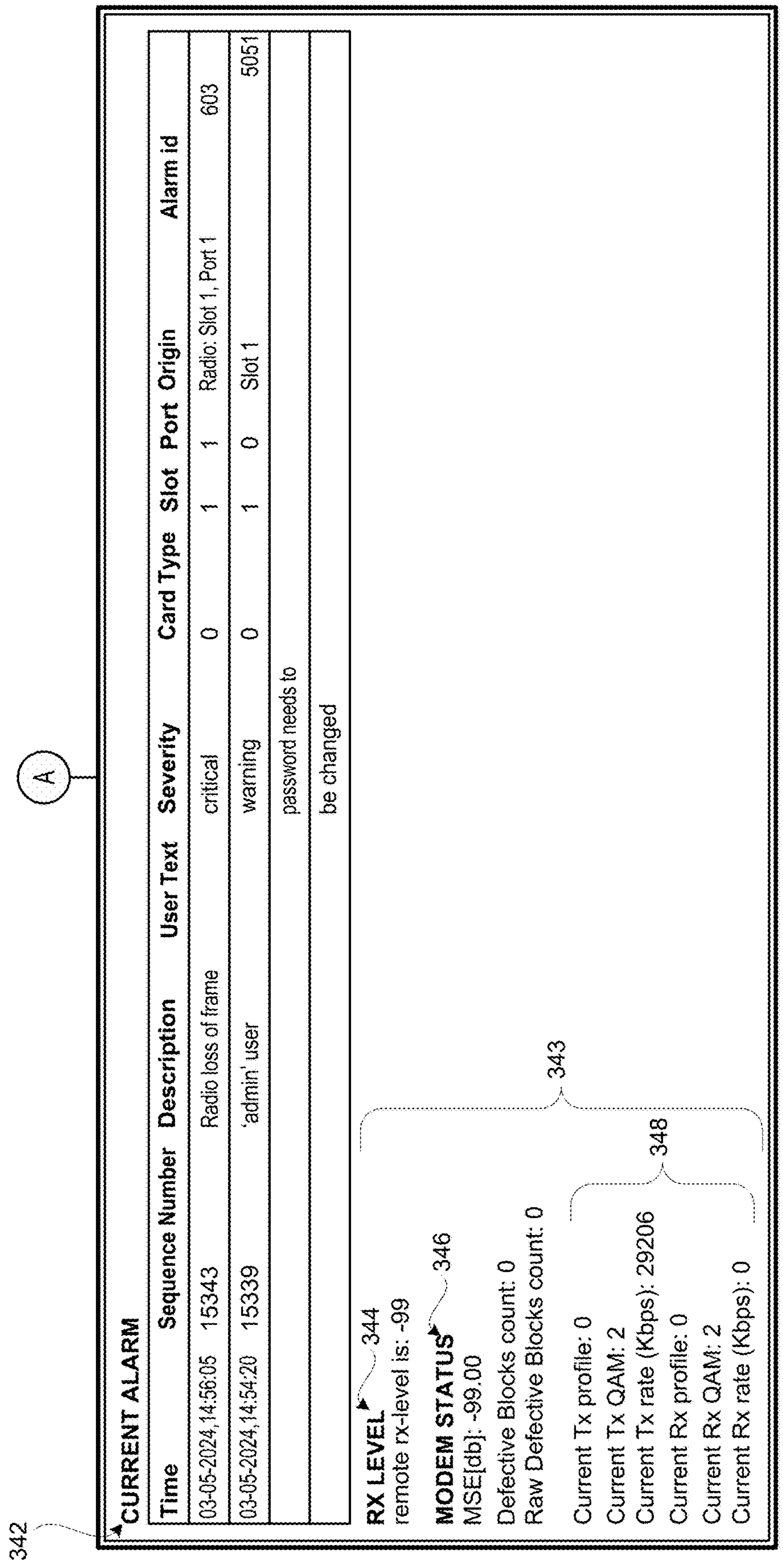
FIG. 3 illustrates a detailed view of the microwave network monitoring system's graphical user interface (GUI) for a specific use case, according to one non-limiting embodiment.

FIG. 3 illustrates a detailed view of the microwave network monitoring system's graphical user interface (GUI) 300 for a specific use case. The interface is divided into several sections that provide comprehensive information about the microwave link's performance and status. This comprehensive view enables network operators to quickly assess the health and performance of the microwave link, correlate events with performance metrics, and identify ongoing issues.

At the top of the interface, a header 301 displays the link identifier "AUWCO00058A_AUWCO00047A", which identifies the link that is the subject of this example use case, along with the collection timestamp. The first section presents an Event Log 304 in a tabular format. In the present example embodiment, this Event Log 304 includes columns for Time 306, Sequence Number 308, Description 310, User Text 312, Severity 314, State 316, Card Type 318, Slot 320, and Port 322. The log entries provide a chronological record of events related to the microwave link, with critical events such as, for example, "Enhanced Multi Carrier ABC LOF" displayed.

Below the Event Log 304 is the Multi-Rate Multi-Constellation Performance Monitoring (MRMC PM) Table 15 min 324, which shows Multi-Rate Multi-Constellation Performance Monitoring data in 15-minute intervals for link "AUWCO00058A_AUWCO00047A". This table 324 includes columns for Interval 326, Integrity 328, Min profile 330, Max profile 332, Min bitrate 334, Max bitrate 336, and various threshold-related metrics 338. The Integrity column consistently shows a value of 1, which determines the downgraded/down link. The Current Alarm section 342 displays active alarms in the system. In the present example, two alarms are shown for link "AUWCO00058A_AUWCO00047A", one critical and one warning, providing immediate visibility into ongoing issues. The prominence of the Integrity value and its relationship to link status highlights the system's ability to quickly determine and display critical link conditions, facilitating rapid troubleshooting and maintenance actions.

At the bottom of the interface 300, a status section provides real-time information about link "AUWCO00058A_AUWCO00047A". This includes the RX LEVEL 344 showing the remote rx-level value, MODEM STATUS 346 displaying the MSE (dB) value and defective block counts, and current transmission and reception profiles 348 listing Tx/Rx profile numbers, QAM values, and data rates.

FIGS. 4A, 4B, 4C and 4D illustrate a graphical trends GUI feature of the microwave network monitoring system. This view provides a comprehensive visual representation of various performance metrics over time.

Figure 4A:
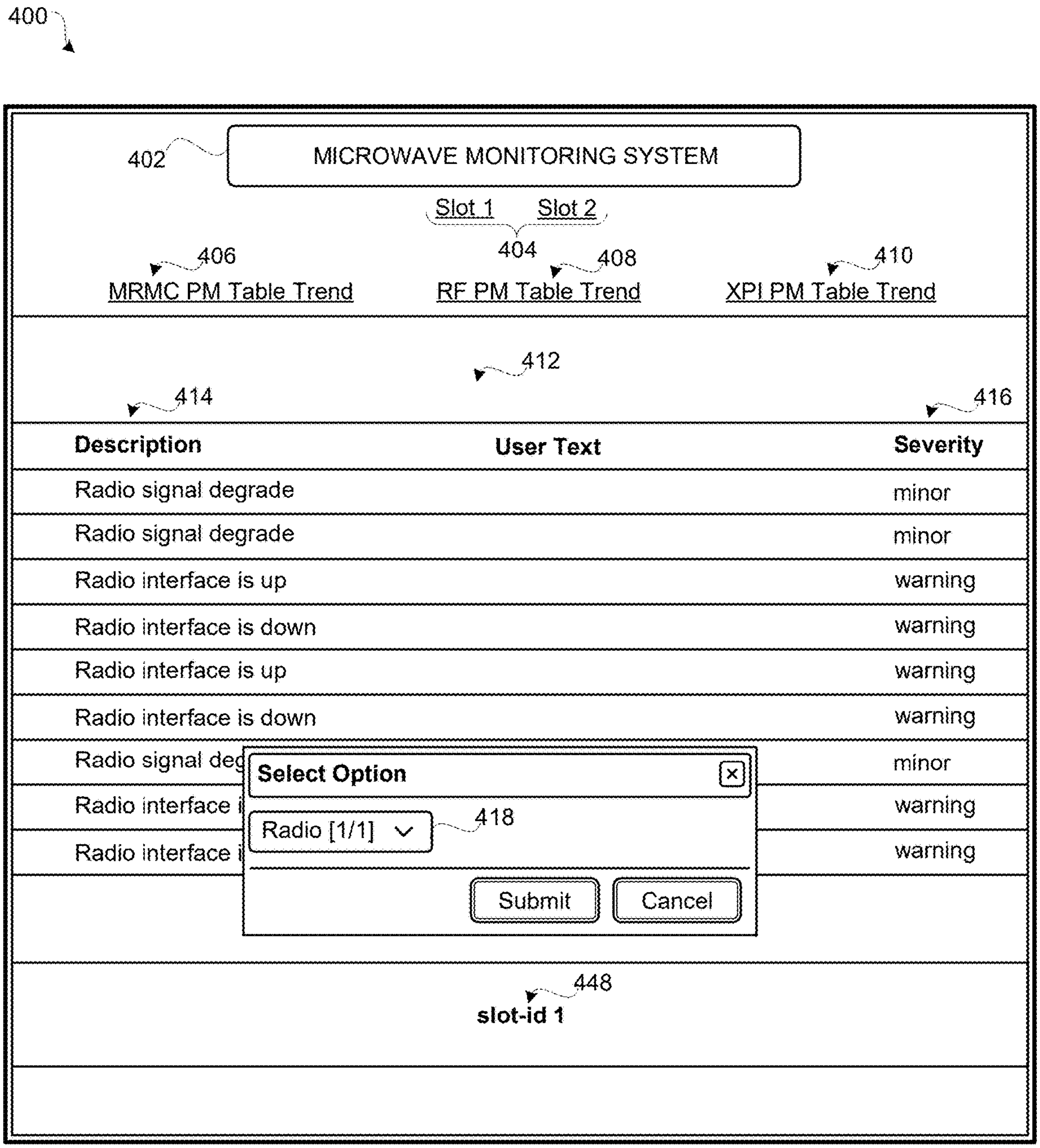
FIGS. 4A, 4B, 4C and 4D illustrate a graphical trends GUI feature of the microwave network monitoring system, according to one non-limiting embodiment.

The main interface section 400 shown in FIG. 4A represents a portion of the GUI 200 of FIG. 2 and contains the header "MICROWAVE MONITORING SYSTEM" 402 and includes tab selectors for Slot 1 and Slot 2 404. Below this are options for different trend views including "MRMC PM Table Trend" 406, "RF PM Table Trend" 408, and "XPI PM Table Trend" 410. Below the trend options is an event log table 412 displaying recent events with columns for Description 414 and Severity 416. A dropdown menu 418 enables users to select specific radio options, enhancing the interface's flexibility. At the bottom of the main interface section 400, a slot identifier 448 indicates that the displayed data is for "slot-id 1". The system converts raw data into easily interpretable graphical trends. This graphical representation enables network operators to quickly identify patterns, anomalies, and potential issues in the microwave link's performance over time. The combination of event logs and performance trends in a single view facilitates rapid correlation between specific events and their impact on link performance, enabling more efficient troubleshooting and proactive maintenance.

Figure 4B:
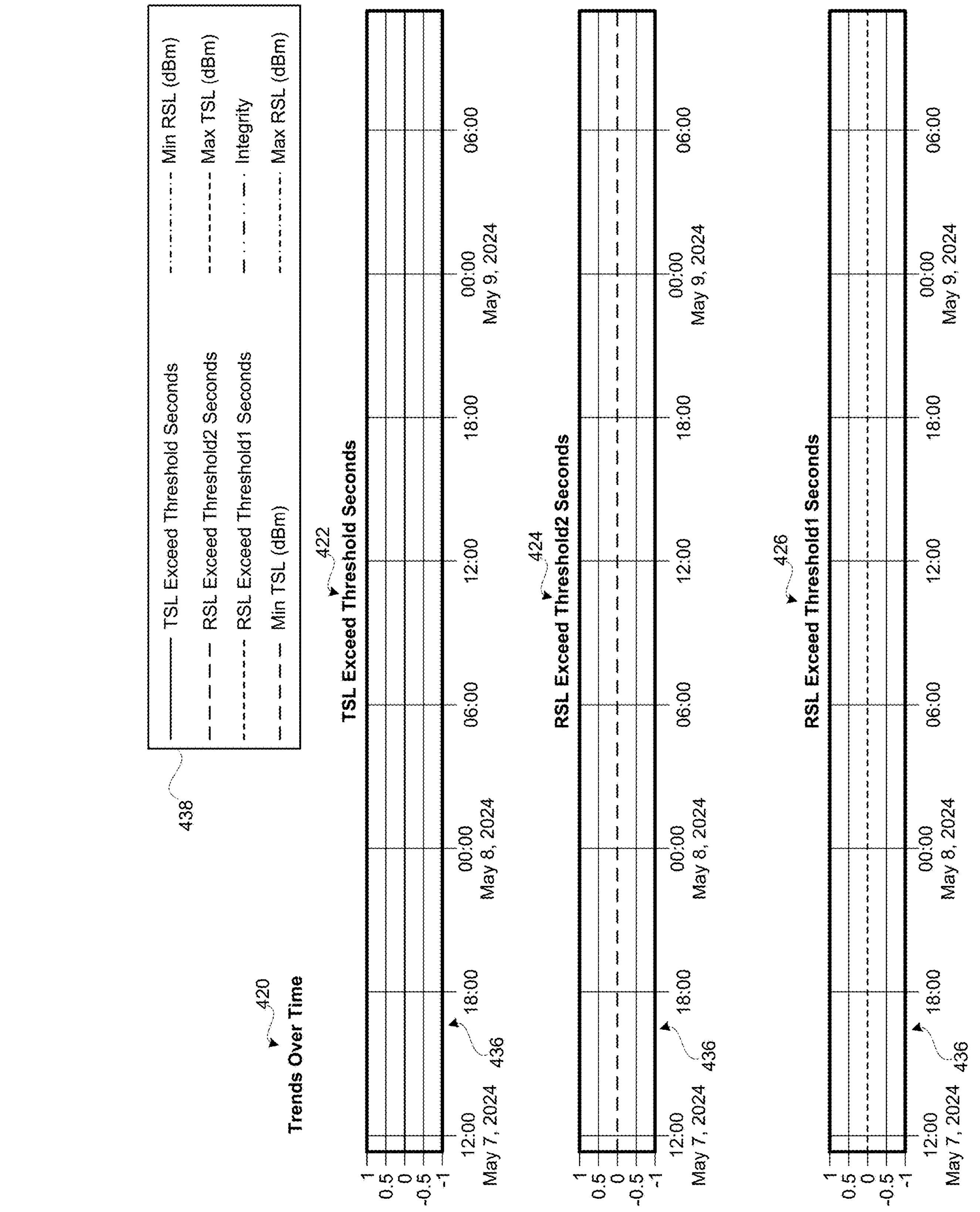
Figure 4C:
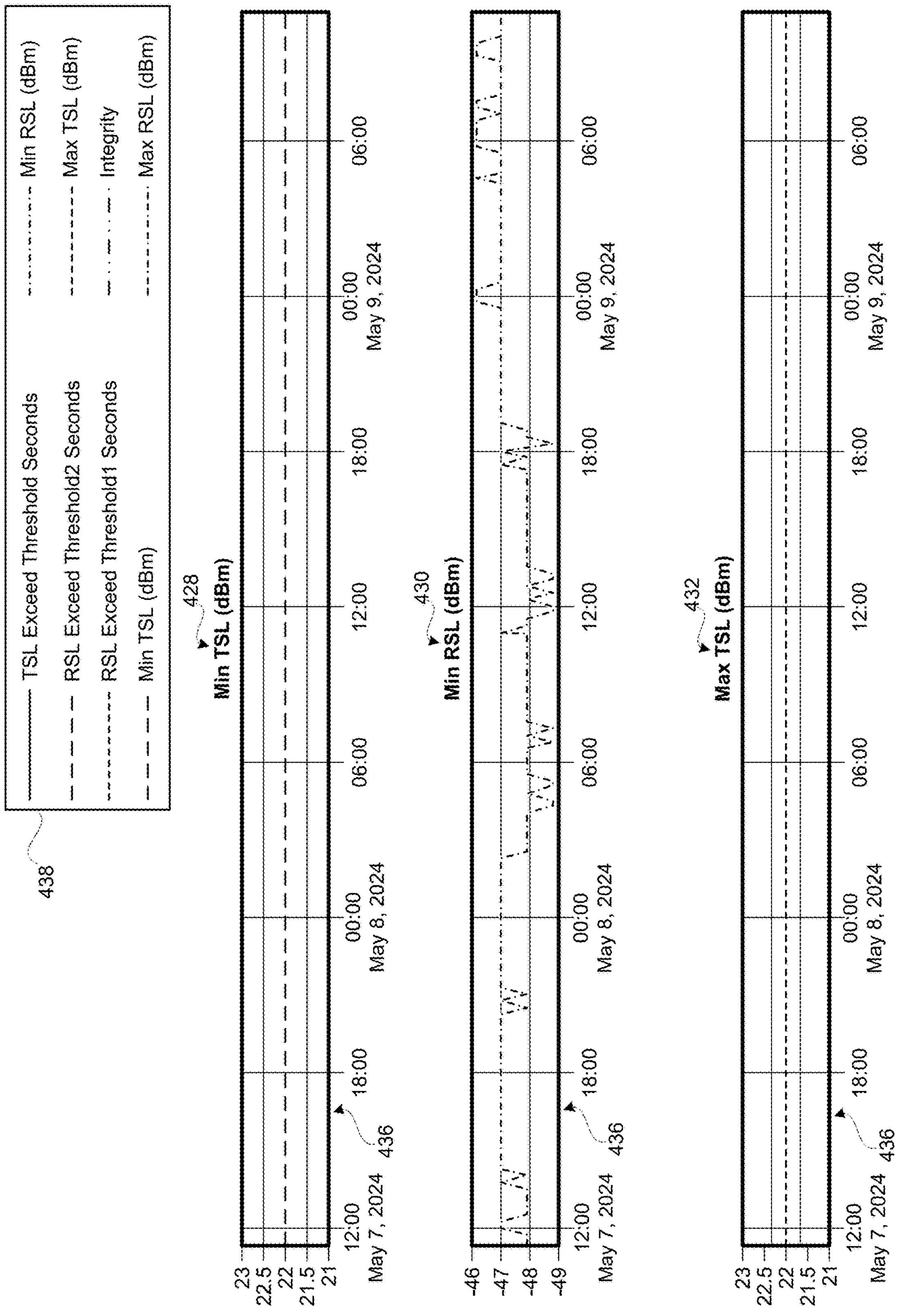
Figure 4D:
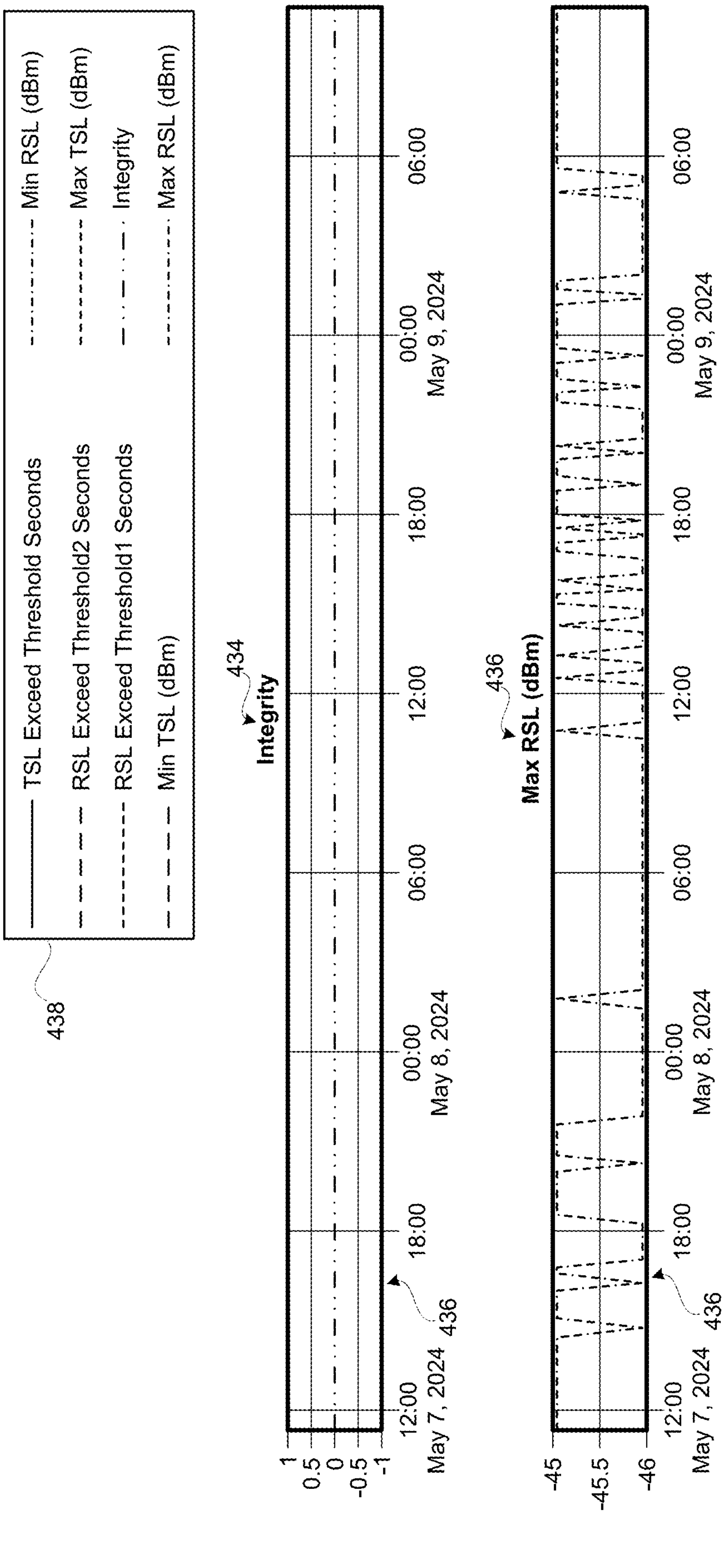

In particular, shown in FIGS. 4B, 4C and 4D are "Trends Over Time" graphs 420. In the present example, the "Trends Over Time" graphs 420 includes multiple line graphs, each representing a different performance metric. In the present example shown in in FIGS. 4B, 4C and 4D, the currently selected view results from selection of the "RF PM Table Trend" option 408 in the main interface section 400 shown in FIG. 4A. These metrics include TSL exceed threshold seconds 422, RSL exceed threshold2 seconds 424 and RSL exceed threshold1 seconds 426 shown in FIG. 4B; Min TSL (dBm) 428, Min RSL (dBm) 430 and Max TSL (dBm) 432 shown in FIG. 4C; and Integrity 434 and Max RSL (dBm) 436 shown in FIG. 4D. Each graph may be color-coded and labeled for easy identification. The x-axis 436 represents time, spanning from May 7, 2024, to May 9, 2024 in the present example. The y-axis scales are adjusted for each metric to provide optimal visibility of trends. Corresponding graphs may be displayed as a result from selecting the corresponding option in the main interface section 400 for "MRMC PM Table Trend" 406 and "XPI PM Table Trend" 410. A legend 438 is also provided, correlating colors to specific metrics for easy reference.

Figure 5:
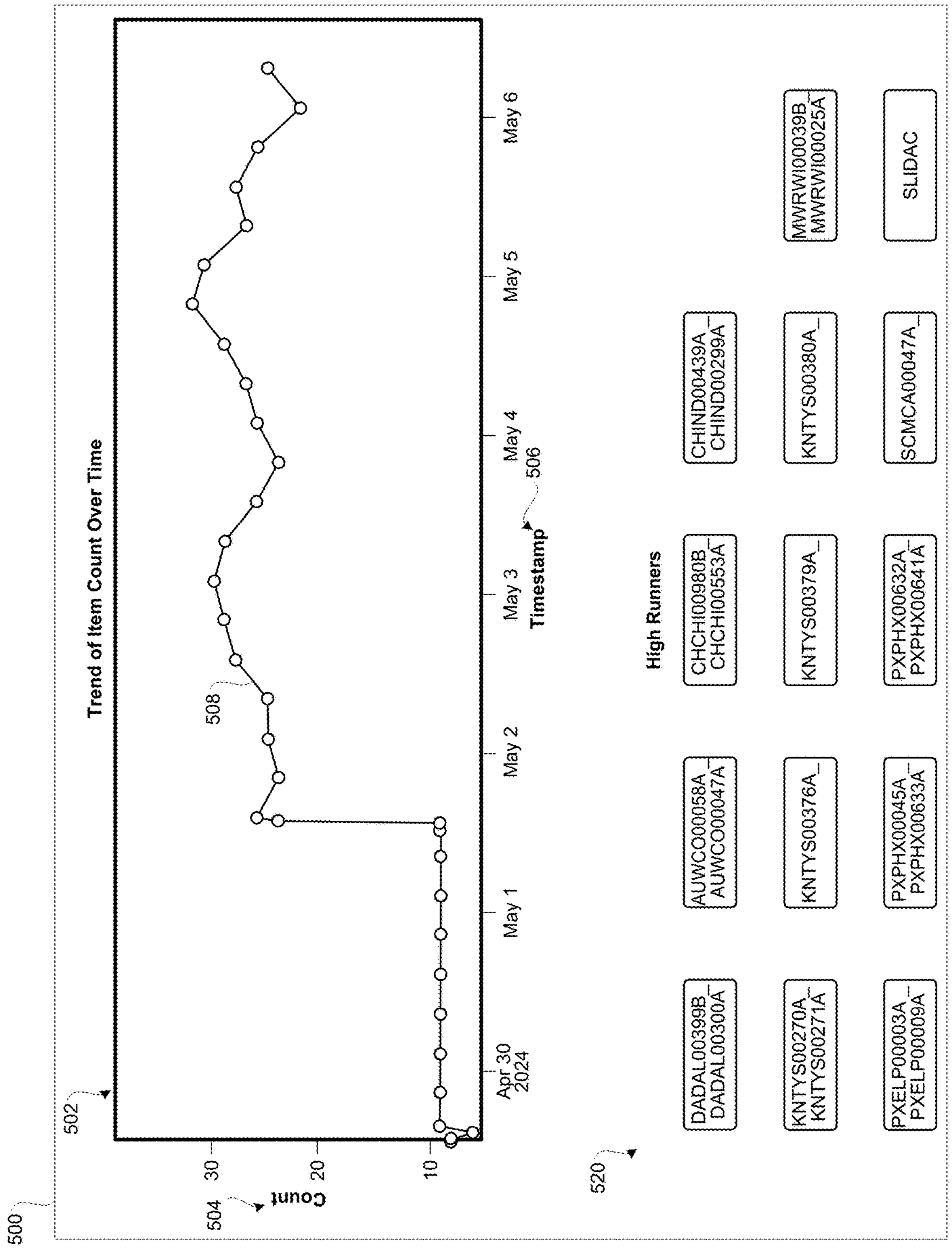
FIG. 5 illustrates a High Runner dashboard interface of the microwave network monitoring system, according to one non-limiting embodiment.

FIG. 5 illustrates the High Runner dashboard interface 500 of the microwave network monitoring system, which provides a comprehensive overview of network performance trends and identifies links requiring attention.

The interface 500 is divided into two main sections including a trend graph 502 at the top and a High Runners display 520 below. The trend graph 500, titled "Trend of Item Count Over Time", shows the number of high runner incidents over a week-long period. The y-axis represents the count 504, ranging from 0 to 30, while the x-axis shows the timestamp 506 from Apr. 30, 2024, to May 6, 2024. The line 508 represents the trend, showing a significant increase in high runner incidents starting May 2, with fluctuations between 20 and 30 incidents per day thereafter in the present example.

The High Runners section 520 displays a grid of boxes, each representing a microwave link identified as a high runner. Each box contains a unique link identifier, such as "DADAL00399B_DADAL00300A" or "AUWCO00058A_AUWCO00047A". These identifiers correspond to specific microwave links in the network that are experiencing performance issues or have crossed predefined thresholds. The layout of the High Runners section enables quick identification of problematic links.

The High Runner dashboard interface 500 provides a visual representation of network health trends over time, enabling operators to quickly identify periods of increased issues. It offers immediate visibility into which specific links are experiencing problems, facilitating rapid response and troubleshooting. The combination of the trend graph 502 and individual link identifiers in the high runners section 520 enables operators to correlate overall network performance with specific problematic links. By converting complex data into this graphical trend and high runner list, the system enhances the accessibility and usability of network performance data. This technique enables network operators to quickly assess the state of the network, prioritize issues, and take proactive measures to maintain optimal network performance.

Figure 6:
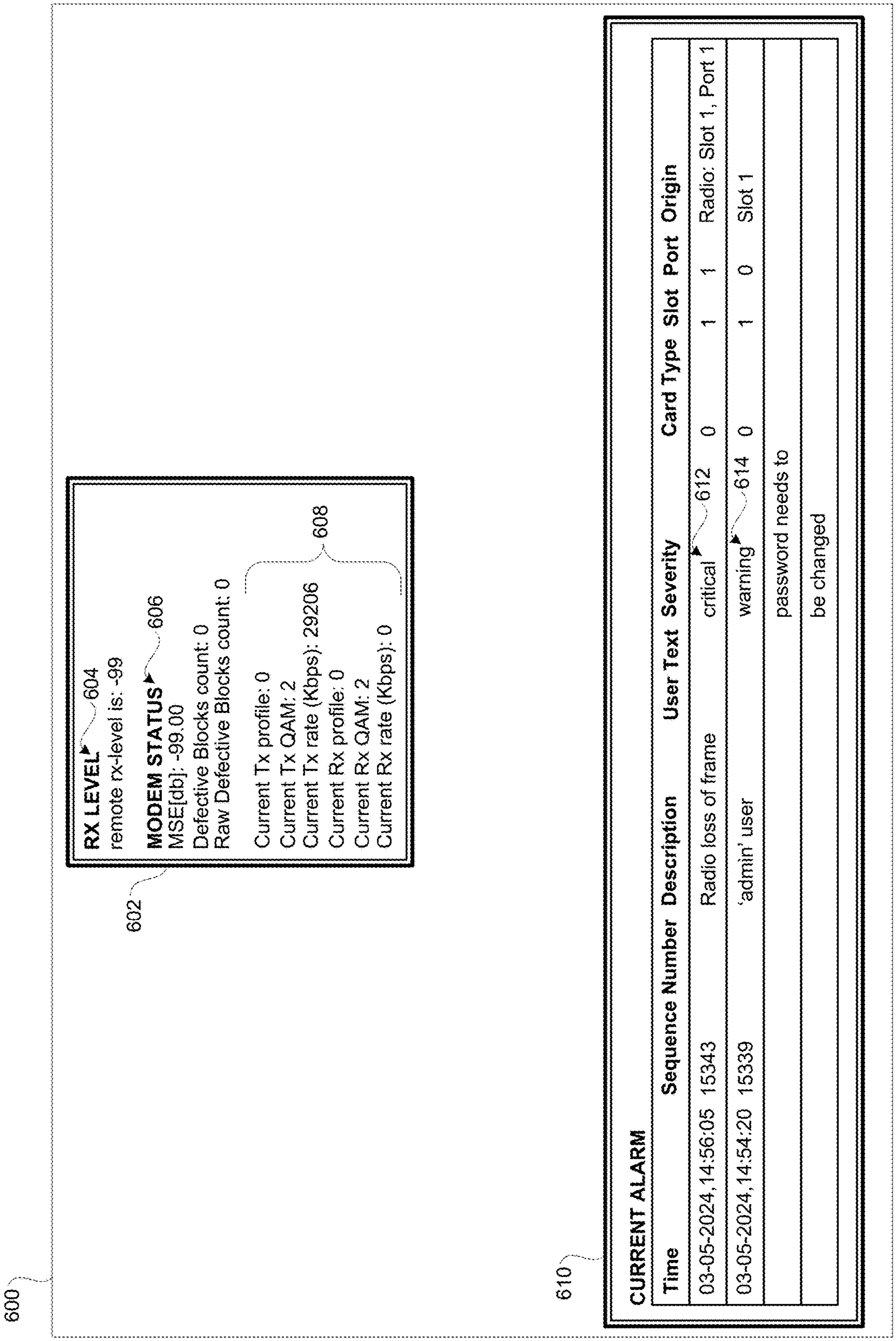
FIG. 6 illustrates an interface of the microwave network monitoring system in the example use case of a specific link, according to one non-limiting embodiment.

FIG. 6 illustrates an interface 600 of the microwave network monitoring system in the example use case of the link identified as "AUWCO00058A_AUWCO00047A". This interface 600 provides a comprehensive view of the link's status and current alarms, demonstrating the system's capability to offer detailed diagnostics and real-time monitoring.

On the upper portion of the interface 600, a status panel 602 displays current technical parameters of the link. This panel includes the RX LEVEL 604 for link "AUWCO00058A_AUWCO00047A", showing a remote rx-level of −99, and MODEM STATUS 606 for link "AUWCO00058A_AUWCO00047A", indicating an MSE [db] of −99.00 and zero defective blocks. The panel 602 also presents current transmission and reception profiles 608, including Tx/Rx profiles, QAM values, and data rates. These values provide a snapshot of the link's current operational state, with several indicators suggesting severe performance issues.

The lower portion of the interface 600 displays a CURRENT ALARM table 610. The CURRENT ALARM table 610 provides real-time information about active alarms for link "AUWCO00058A_AUWCO00047A". In this case study, two alarms are displayed including a critical alarm 612 indicating "Radio loss of frame" on Slot 1, Port 1 and a warning 614 related to an 'admin' user, suggesting a password change is needed.

The interface 600 for the use case involving link "AUWCO00058A_AUWCO00047A" effectively demonstrates the system's ability to aggregate diverse data points into a single, comprehensive view, enabling quick assessment of a link's health. The presentation of detailed technical parameters enables both rapid problem identification and in-depth troubleshooting. The real-time alarm display further enhances the system's utility for proactive network management.

In this particular use case, the system has identified several issues with the link, including issues due to a failure in the XPIC link and a down state of Slot 1 Port 1 radio due to an IF cable issue. Additionally, a faulty modem card has been detected. The use case highlights detecting issues that lead to a direct impact on customer throughput (THPT). This example use case demonstrates how the microwave network monitoring system enables network operators to quickly identify and address problems that might otherwise go unnoticed, potentially mitigating service impacts to customers.

Figure 7A:
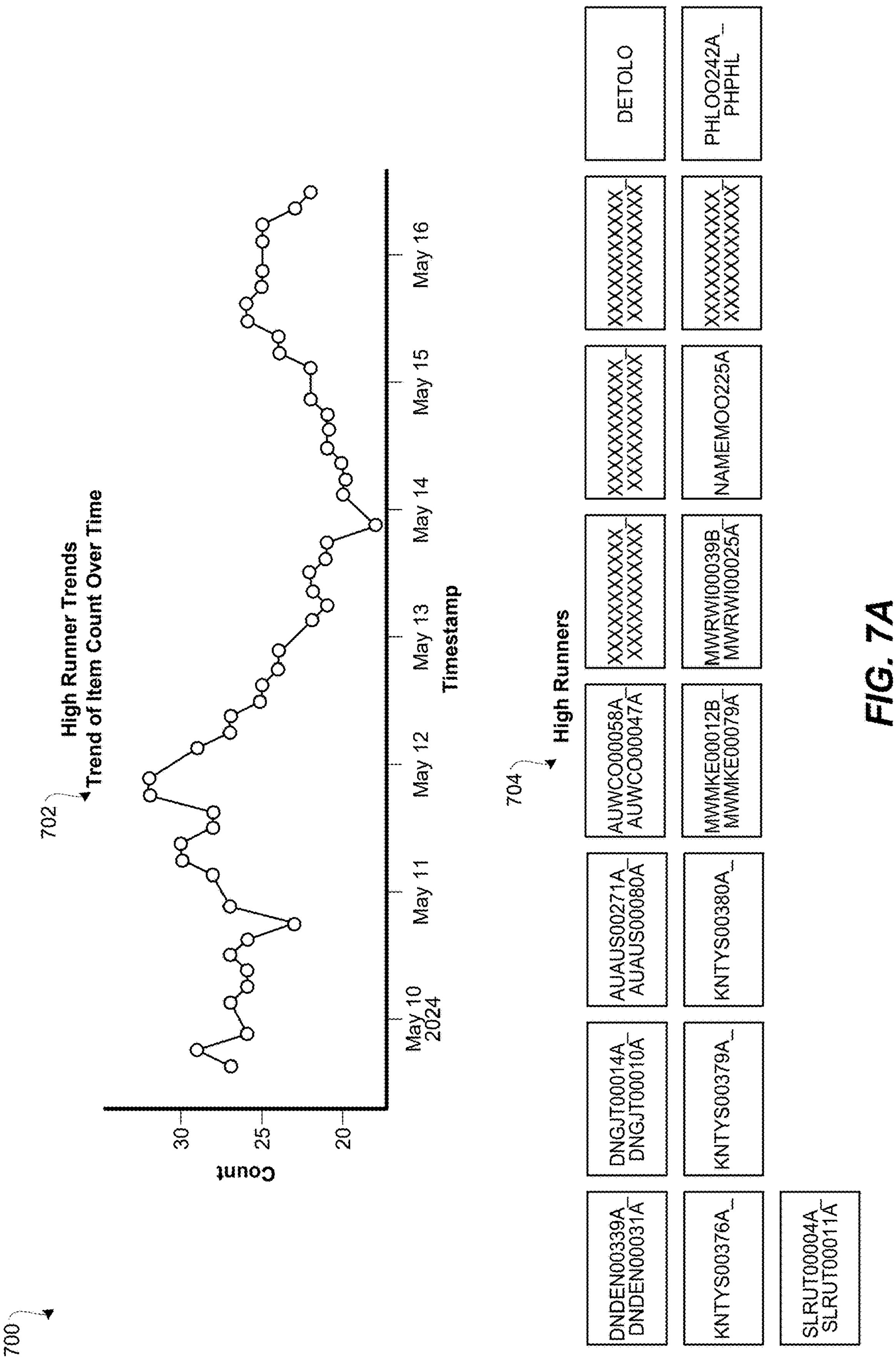
FIGS. 7A, 7B and 7C illustrate a comprehensive dashboard of the microwave network monitoring system, showing various trend analyses for a use case example, according to one non-limiting embodiment.
Figure 7A:
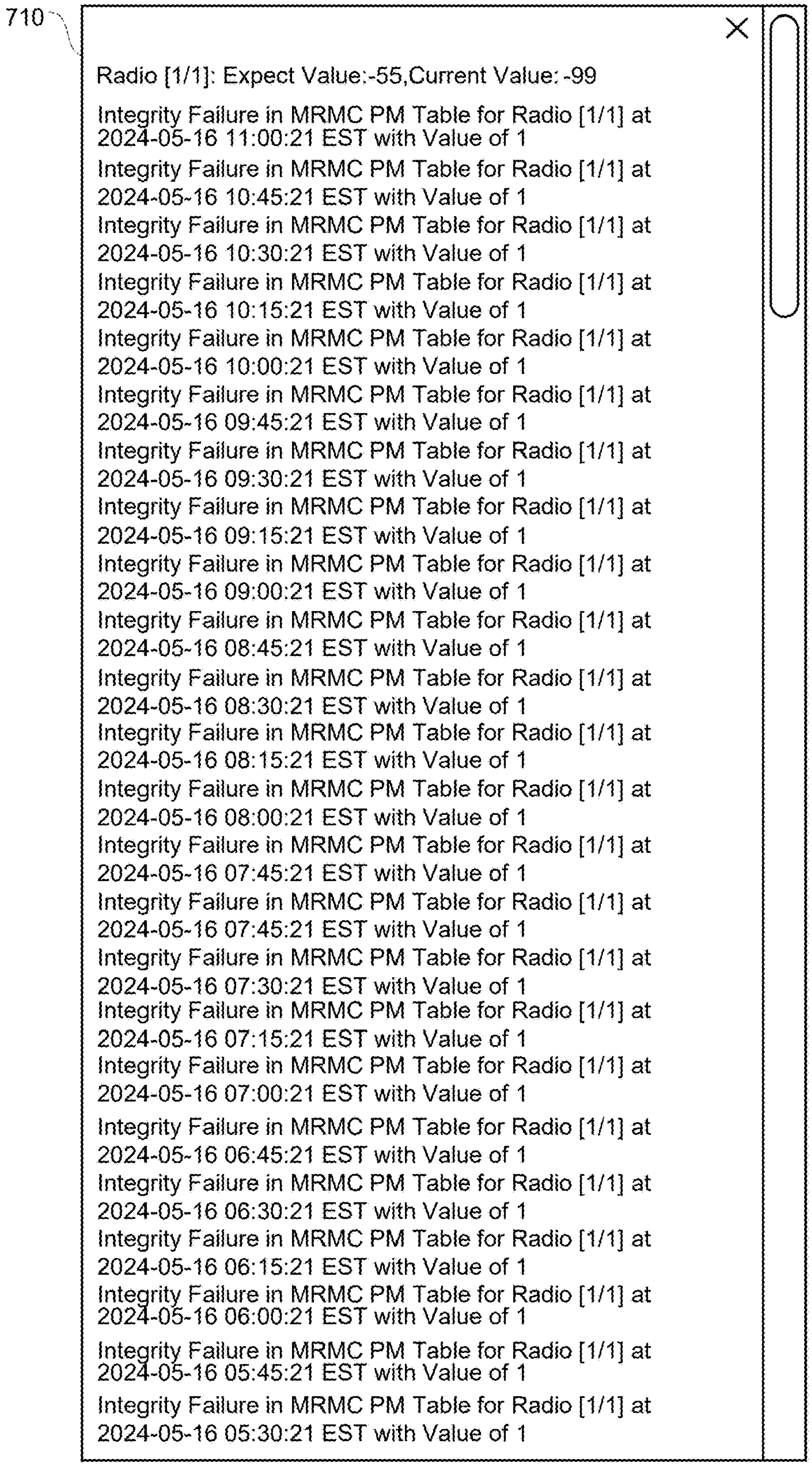
Figure 7B:
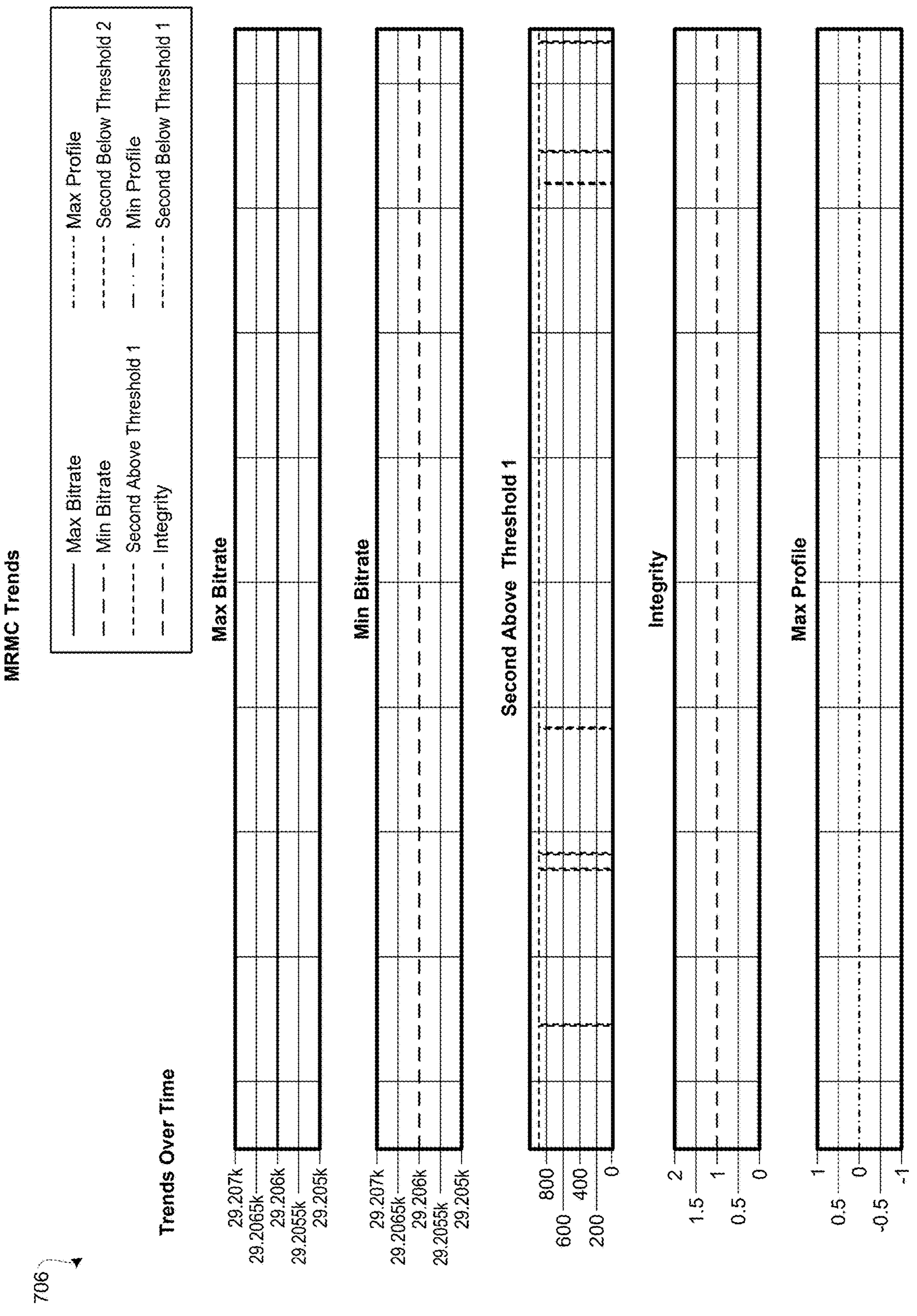
Figure 7C:
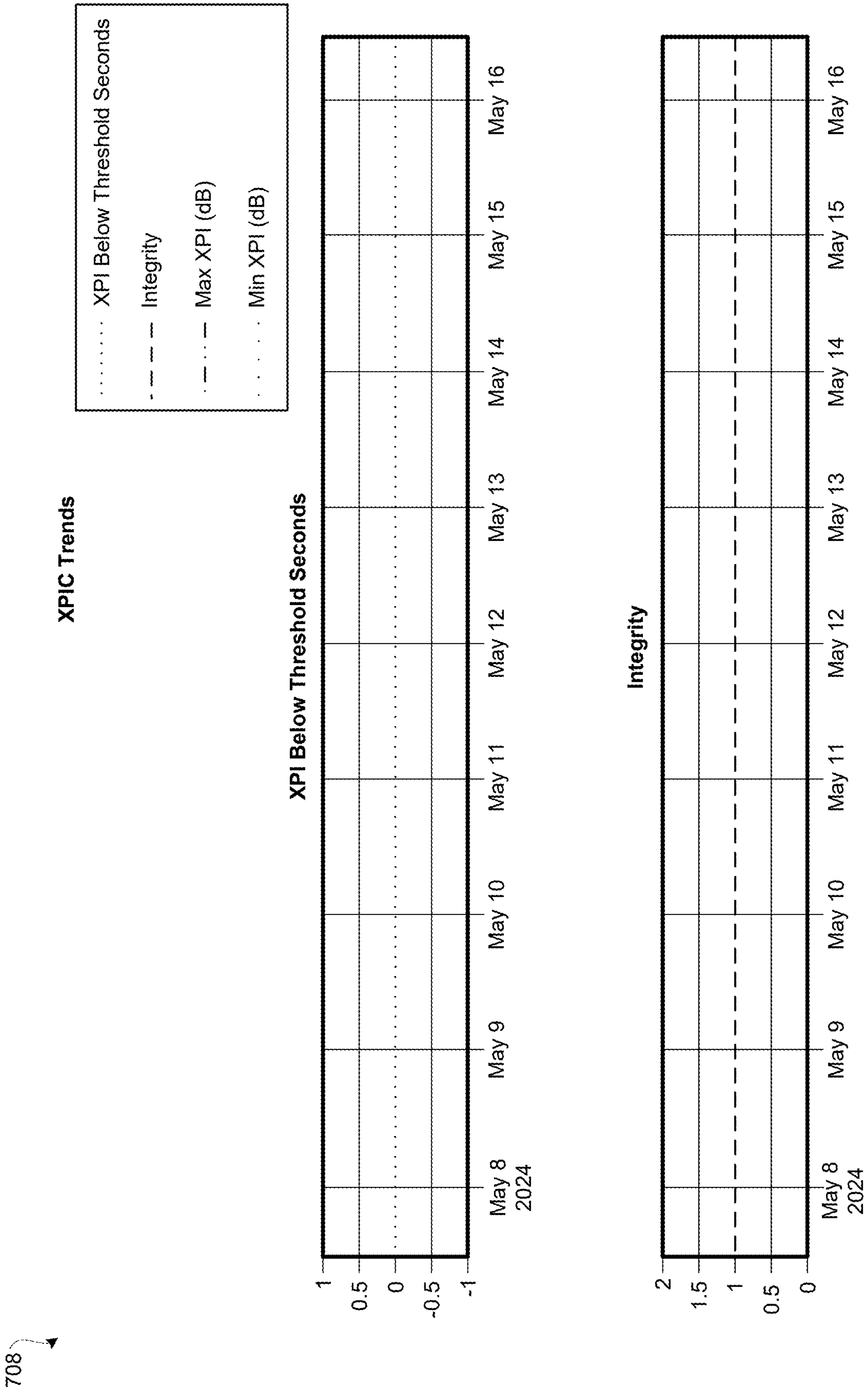
Figure 7C:
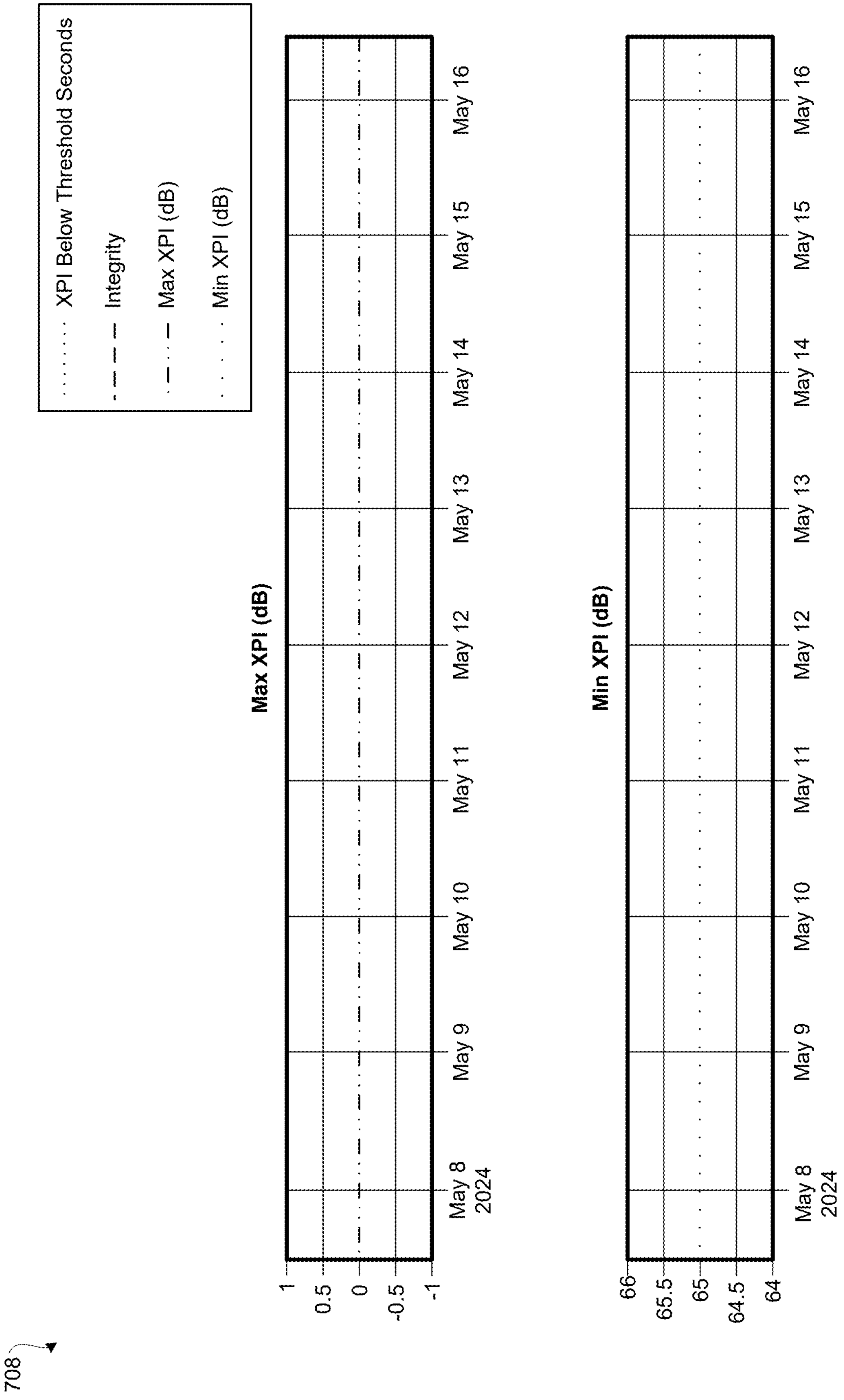

FIG. 7A, FIG. 7B and FIG. 7C illustrate a comprehensive dashboard of the microwave network monitoring system, showcasing various trend analyses for use case example. The interface is divided into several key sections, each providing critical insights into network performance.

In FIG. 7A, a "High Runner Trends" section 700 is displayed. This section includes a graph 702 titled "Trend of Item Count Over Time," which plots the number of high runner incidents over a period from May 10 to May 15, 2024. The y-axis represents the count of incidents, while the x-axis shows the date. This graph 702 enables network operators to quickly visualize patterns in network issues over time. A scrollable text box 710 which in some embodiments may be superimposed over, or displayed in conjunction with, the "High Runner Trends" section 700 provides detailed high runner reports, offering specific information about each incident.

Below the graph 702, a "HighRunners" grid 704 displays multiple boxes, each representing a specific microwave link identified as a high runner. These boxes contain unique identifiers for each problematic link, enabling quick identification of troubled areas in the network.

In FIG. 7B, shown is a "MRMC Trends" chart 706 and in FIG. 7C shown is a "XPIC Trends" chart 708. The MRMC Trends chart 706 displays several metrics over time, including max bitrate, min bitrate, seconds above Threshold 1, integrity, and max profile. This multi-line graph enables simultaneous monitoring of various Multi-Rate Multi-Constellation (MRMC) parameters.

The "XPIC Trends" chart 708 shows Cross-Polarization Interference Cancellation (XPIC) metrics. It includes graphs for XPI below threshold seconds, integrity, Max XPI (dB), and Min XPI (dB). These trends are crucial for monitoring the performance of dual-polarized microwave links.

The interfaces shown in FIG. 7A, FIG. 7B and FIG. 7C illustrate the system's capability to record and analyze link failures as high runners, provide exact alarm/issue information for immediate action, and track critical parameters like MRMC profiles. The comprehensive view enables market operators to quickly identify and address issues, significantly reducing response time to network problems. The combination of high-level trend analysis and detailed performance metrics in a single dashboard exemplifies the microwave network monitoring system's ability to provide both broad oversight and granular diagnostics. This facilitates efficient network management, rapid troubleshooting, and proactive maintenance, ultimately ensuring better service quality and reliability for end-users.

Figure 8:
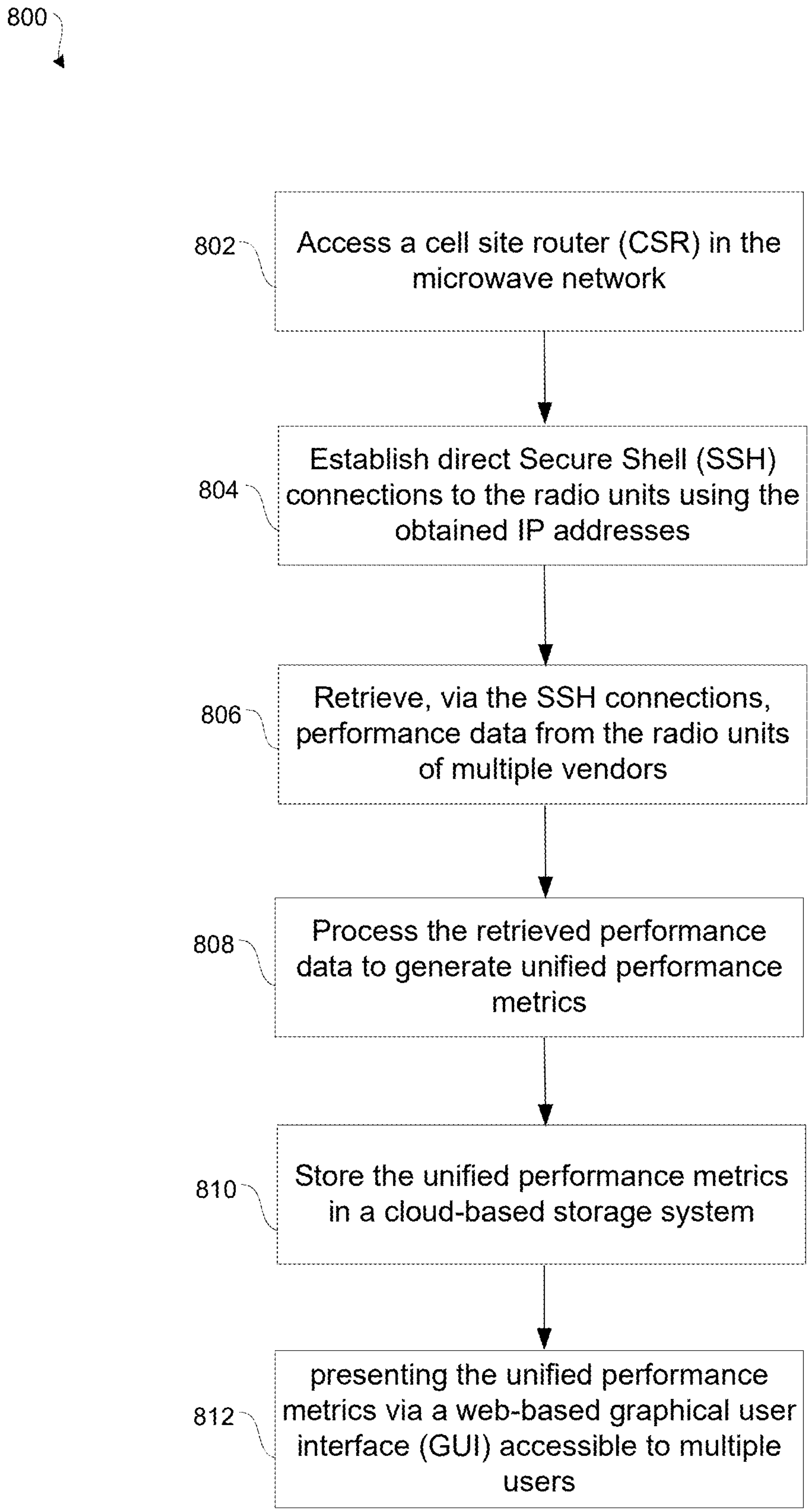
FIG. 8 is a flow diagram of an example method for microwave network monitoring, according to one non-limiting embodiment.
Figure 9:
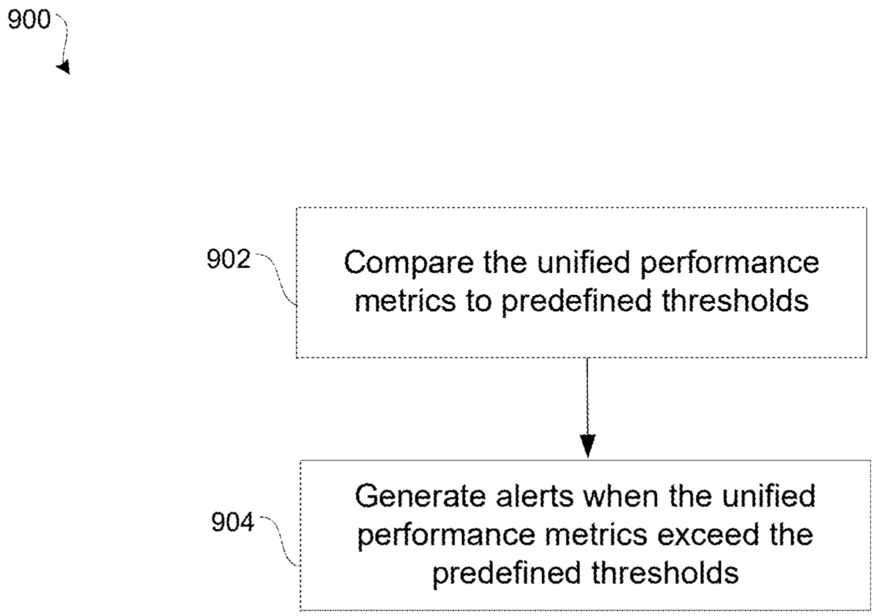
FIG. 9 is a flow diagram of an example method for generating alerts useful in the method for microwave network monitoring of FIG. 8, according to one non-limiting embodiment.

FIG. 8 is a flow diagram of an example method 800 for microwave network monitoring, according to one non-limiting embodiment.

At 802, the network monitoring system (NMS) 100 accesses a cell site router (CSR) in the microwave network.

At 804, the NMS 100 obtains, from the CSR, IP addresses of radio units in the microwave network.

At 806, the NMS 100 establishes direct Secure Shell (SSH) connections to the radio units using the obtained IP addresses.

At 808, the NMS 100 retrieving, via the SSH connections, performance data from the radio units of multiple vendors.

At 810, the NMS 100 processes the retrieved performance data to generate unified performance metrics. Processing the retrieved performance data may include normalizing data from different vendor-specific formats into a common format for the unified performance metrics.

At 812, the NMS 100 stores the unified performance metrics in a cloud-based storage system.

At 814, the NMS 100 presents the unified performance metrics via a web-based graphical user interface (GUI) accessible to multiple users without requiring local client software installation.

FIG. 8 is a flow diagram of an example method 900 for generating alerts useful in the method 800 for microwave network monitoring, according to one non-limiting embodiment.

At 902, the NMS 100 compares the unified performance metrics to predefined thresholds.

At 904, the NMS 100 generates alerts when the unified performance metrics exceed the predefined thresholds.

Figure 10:
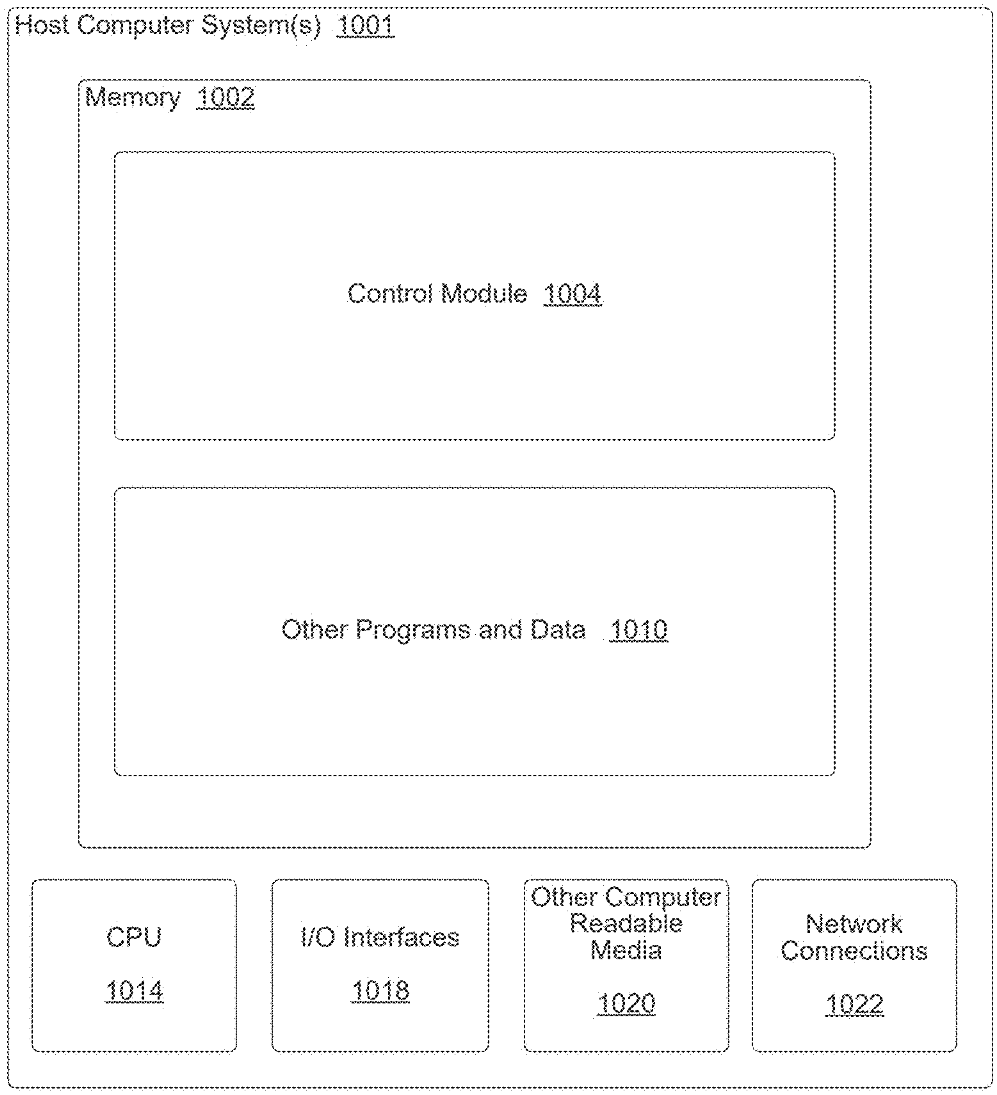
FIG. 10 shows a system diagram that describes an example implementation of computing system(s) for implementing embodiments described herein, according to one non-limiting embodiment.

FIG. 10 shows a system diagram that describes an example embodiment of a computing system(s) 1001 for implementing embodiments described herein.

The functionality described herein for the microwave network monitoring system can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 10 illustrates an example of underlying hardware on which such software and functionality may be hosted and/or implemented.

In particular, shown is example host computer system(s) 1001. For example, such computer system(s) 1001 may represent one or more of those in various data centers, servers, network nodes, base stations and cell sites shown and/or described herein that are, or that host or implement the functions of: routers, components, microservices, PODs, containers, nodes, node groups, control planes, clusters, virtual machines, network functions (NFs), and/or other aspects described herein for the microwave network monitoring system. In some embodiments, one or more special-purpose computing systems may be used to implement the functionality described herein. Accordingly, various embodiments described herein may be implemented in software, hardware, firmware, or in some combination thereof. Host computer system(s) 1001 may include memory 1002, one or more processors such as central processing units (CPUs) 1014, I/O interfaces 1018, other computer-readable media 1020, and network connections 1022.

Memory 1002 may be coupled to CPUs 1014 and include one or more various types of non-volatile and/or volatile storage technologies. Examples of memory 1002 may include, but are not limited to, a computer-readable storage medium, flash memory, hard disk drives, optical drives, solid-state drives, various types of random access memory (RAM), various types of read-only memory (ROM), neural networks, other computer-readable storage media (also referred to as processor-readable storage media and non-transitory computer-readable storage media), or the like, or any combination thereof. Memory 1002 may be utilized to store information, including computer-readable and computer-executable instructions that are utilized and executed by CPU 1014 to cause operations to be performed, including those of embodiments described herein.

Memory 1002 may have stored thereon control module(s) 1004. The control module(s) 1004 may be configured to implement and/or perform some or all of the functions of the systems, components and modules described herein for the microwave network monitoring system. Memory 1002 may also store other programs and data 1010, which may include rules, databases, application programming interfaces (APIs), rules and data, software containers, nodes, PODs, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1022 are configured to communicate with other computing devices to facilitate the functionality described herein. In various embodiments, the network connections 1022 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1018 may include location data interfaces, sensor data interfaces, interfaces, other data input or output interfaces, or the like. Other computer-readable media 1020 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for monitoring a multi-vendor microwave network, performed by a network monitoring system, comprising:

accessing a cell site router (CSR) in the multi-vendor microwave network;

obtaining, from the CSR, IP addresses of radio units in the multi-vendor microwave network;

establishing direct Secure Shell (SSH) connections to the radio units using the obtained IP addresses;

retrieving, via the direct SSH connections, performance data from the radio units of multiple vendors;

processing the retrieved performance data to generate unified performance metrics;

storing the unified performance metrics in a cloud-based storage system;

presenting the unified performance metrics via a web-based graphical user interface (GUI) accessible to multiple users without requiring local client software installation;

detecting integrity values of microwave links based on the retrieved performance data, wherein the prominence of each integrity value and its relationship to corresponding microwave link status enables the network monitoring system to determine and display critical link conditions;

identifying high-priority links based on the integrity values of microwave links; and alerting management teams about the status of the high-priority links to facilitate preventing service disruptions and enable faster resolution of issues when they occur.

2. The method of claim 1, wherein the performance data includes at least one of: Received Signal Level (RSL), Signal to Noise Ratio (SNR), Multi-Rate Multi-Constellation (MRMC) data, Cross Polarization Interference Cancellation (XPIC) data, and Mean Square Error (MSE).

3. The method of claim 1, further comprising:

comparing the unified performance metrics to predefined thresholds; and generating alerts when the unified performance metrics exceed the predefined thresholds.

4. The method of claim 3, wherein the alerts are presented as graphical trends in the web-based GUI.

5. The method of claim 1, further comprising storing historical performance data for a predetermined period and presenting historical performance trends via the web-based GUI.

6. The method of claim 1, wherein processing the retrieved performance data includes normalizing data from different vendor-specific formats into a common format for the unified performance metrics.

7. A system for monitoring a multi-vendor microwave network, performed by a network monitoring system, comprising:

one or more processors; and at least one memory coupled to the one or more processors, the at least one memory storing instructions that, when executed by the one or more processors, cause the system to perform operations comprising:

accessing a cell site router (CSR) in the multi-vendor microwave network;

obtaining, from the CSR, IP addresses of radio units in the multi-vendor microwave network;

establishing direct Secure Shell (SSH) connections to the radio units using the obtained IP addresses;

retrieving, via the direct SSH connections, performance data from the radio units of multiple vendors;

processing the retrieved performance data to generate unified performance metrics;

storing the unified performance metrics in a cloud-based storage system;

presenting the unified performance metrics via a web-based graphical user interface (GUI) accessible to multiple users without requiring local client software installation;

detecting integrity values of microwave links based on the retrieved performance data, wherein the prominence of each integrity value and its relationship to corresponding microwave link status enables the network monitoring system to determine and display critical link conditions;

identifying high-priority links based on the integrity values of microwave links; and alerting manas teams about the status of the high-priority links to facilitate preventing service disruptions and enable faster resolution of issues when they occur.

8. The system of claim 7, wherein the performance data includes at least one of: Received Signal Level (RSL), Signal to Noise Ratio (SNR), Multi-Rate Multi Constellation (MRMC) data, Cross Polarization Interference Cancellation (XPIC) data, and Mean Square Error (MSE).

9. The system of claim 7, wherein the operations further comprise:

comparing the unified performance metrics to predefined thresholds; and generating alerts when the unified performance metrics exceed the predefined thresholds.

10. The system of claim 9, wherein the alerts are presented as graphical trends in the web-based GUI.

11. The system of claim 7, wherein the operations further comprise storing historical performance data for a predetermined period and presenting historical performance trends via the web-based GUI.

12. The system of claim 7, wherein processing the retrieved performance data includes normalizing data from different vendor-specific formats into a common format for the unified performance metrics.

13. A non-transitory computer-readable medium having instructions stored thereon that, when executed by one or more processors, cause the one or more processors to perform operations for monitoring a multi-vendor microwave network, performed by a network monitoring system, the operations comprising:

accessing a cell site router (CSR) in the multi-vendor microwave network;

obtaining, from the CSR, IP addresses of radio units in the multi-vendor microwave network;

establishing direct Secure Shell (SSH) connections to the radio units using the obtained IP addresses;

retrieving, via the direct SSH connections, performance data from the radio units of multiple vendors;

processing the retrieved performance data to generate unified performance metrics;

storing the unified performance metrics in a cloud-based storage system;

presenting the unified performance metrics via a web-based graphical user interface (GUI) accessible to multiple users without requiring local client software installation;

detecting integrity values of microwave links based on the retrieved performance data, wherein the prominence of each integrity value and its relationship to corresponding microwave link status enables the network monitoring system to determine and display critical link conditions;

identifying high-priority links based on the integrity values of microwave links, and alerting management teams about the status of the high-priority links to facilitate preventing service disruptions and enable faster resolution of issues when they occur.

14. The non-transitory computer-readable medium of claim 13, wherein the performance data includes at least one of: Received Signal Level (RSL), Signal to Noise Ratio (SNR), Multi-Rate Multi-Constellation (MRMC) data, Cross Polarization Interference Cancellation (XPIC) data, and Mean Square Error (MSE).

15. The non-transitory computer-readable medium of claim 13, wherein the operations further comprise:

comparing the unified performance metrics to predefined thresholds; and generating alerts when the unified performance metrics exceed the predefined thresholds.

16. The non-transitory computer-readable medium of claim 15, wherein the alerts are presented as graphical trends in the web-based GUI.

17. The non-transitory computer-readable medium of claim 13, wherein the operations further comprise storing historical performance data for a predetermined period and presenting historical performance trends via the web-based GUI.

18. The non-transitory computer-readable medium of claim 13, wherein processing the retrieved performance data includes normalizing data from different vendor-specific formats into a common format for the unified performance metrics.

* * * * *